Sept. 8, 1959   L. W. HINDES ET AL   2,902,719
PREPARATION OF EASILY FRIABLE CRYSTALLINE
SUBSTANCES BY A MELT CASTING PROCESS
Filed Jan. 7, 1955   4 Sheets-Sheet 1

INVENTORS
LAWRENCE W. HINDES
HENRY S. CURTIS
JAMES R. SIEMONEIT

BY C. T. Cross

ATTORNEY

Sept. 8, 1959     L. W. HINDES ET AL     2,902,719
PREPARATION OF EASILY FRIABLE CRYSTALLINE
SUBSTANCES BY A MELT CASTING PROCESS
Filed Jan. 7, 1955     4 Sheets-Sheet 2

INVENTORS
LAWRENCE W. HINDES
HENRY S. CURTIS
JAMES R. SIEMONEIT

BY C.T. Cross

ATTORNEY

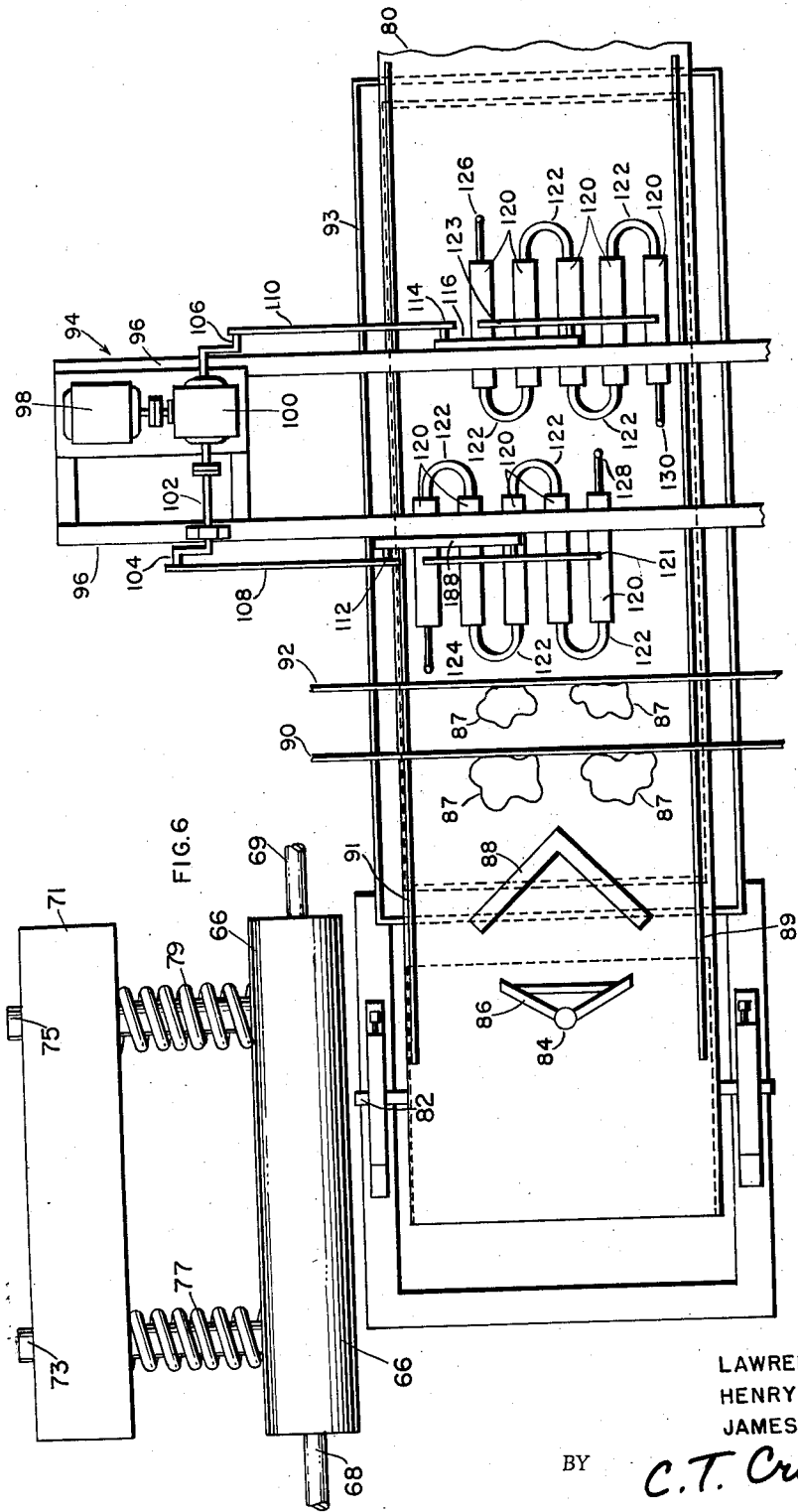

United States Patent Office 2,902,719
Patented Sept. 8, 1959

2,902,719

PREPARATION OF EASILY FRIABLE CRYSTALLINE SUBSTANCES BY A MELT CASTING PROCESS

Lawrence W. Hindes, Houston, Henry S. Curtis, Baytown, and James R. Siemoneit, Pasadena, Tex., assignors to Diamond Alkali Company, Cleveland, Ohio, a corporation of Delaware Application January 7, 1955, Serial No. 480,568

5 Claims. (Cl. 18—47.5)

This invention relates to improvements in the preparation of crystalline solid materials, and more particularly relates to improvements in processes for the preparation of crystalline substances characterized by improved grindability and friability.

As is well-known, a variety of organic and inorganic chemical products have been and are now obtained either from solution or from a molten condition. Whether the crystallization is carried out from an aqueous or other solution, or from the fused state, depends, of course, upon the substance involved, its characteristics, and upon the application intended. In many instances, satisfactory products are obtained by the prior art processes. However, problems frequently are involved in the crystallization of many substances, particularly when the final product must conform to definite standards with respect to physical, chemical, and other properties.

Accordingly, in certain applications crystallizable materials heretofore have often required a series of involved process steps when it was desired to provide a product having specific properties. Typical of properties substantially influenced by the manner of crystallization are those of grindability and friability. These properties are of singular importance when the product is to be utilized in applications involving grinding or other comminuting steps. In some cases, poor grindability and/or friability preclude or restrict the use of crystallized substances in applications in which they otherwise would be ideally suited.

While particular reference hereinafter is made to methods for the production of dichlorodiphenyl-trichloroethane characterized by improved grindability and friability, it will be understood, of course, that the principles of this invention are applicable to the preparation of other crystallizable substances. As is well-known, dichlorodiphenyl-trichloroethane is widely used as an insecticide, the so-called para-para isomer, i.e., 2,2-bis p-chlorophenyl-1,1,1-dichloroethane, having especially desirable insecticidal properties. This substance, which is generally known as, and will be hereinafter referred to as, "DDT," is produced commercially as a mixture of several isomers.

In the most commonly employed form, i.e., a so-called "technical DDT," it is a solid product at ordinary temperatures, melting readily below 100° C., usually at about 90° C.

While, in some applications of DDT, it is relatively unimportant whether the DDT be easily grindable or, in fact, be in a relatively finely-divided state at all, in many commercial uses of DDT it is mandatory that it be employed in finely-divided, particulate form. This is particularly true in the formulation of a wide variety of liquid applications, i.e., solution, slurry, emulsion, or mixture, or dry, granular application, including powders, dusts, or other dry, emulsifiable, wettable or non-wettable compositions utilizing DDT.

It is, therefore, a principal object of the present invention, to avoid the difficulties heretofore encountered in obtaining satisfactorily friable and grindable products, and to provide improved processes for the obtention of crystallized products characterized by improved grindability and friability.

These and other objects and advantages of the invention will appear more fully from the following description.

The present invention contemplates depositing a fused substance to be crystallized as a layer upon a flat traveling surface, the material being deposited at a temperature above its freezing point, and subsequently carrying it through a series of supercooling temperature reduction stages, agitation, and solidification steps. Proper rate of temperature reduction, agitation, and controlled solidification are specified and accomplished in a manner found to be of singular importance in obtaining the desired product.

More particularly, the method of this invention contemplates crystallizing a molten material to obtain a product characterized by improved grindability and friability, the method comprising depositing a material as a layer upon a flat traveling surface and transporting said layer through a crystallization control section wherein the material is supercooled and passed successively through a quiescent pool of semicrystallized material of the type being transported, subsequently in contact with stationary solidified crystal masses of the material being transported, thereafter agitating the material while it is moving in a thin layer, spreading the thus super-cooled liquid to a controlled thickness, allowing it to solidify in a thin layer, and removing a crisp, brittle, flake product.

It will be appreciated, of course, upon depositing a molten material on a flat traveling surface subjected to cooling, that crystallization eventually will take place even without agitation. However, it also must be recognized that a product obtained in such a manner is not uniform, nor is a satisfactory product obtained merely by supercooling of the material to be deposited. Portions of such a crystallized mass may meet desired specifications, but generally other portions are gummy, difficultly grindable, and otherwise unsatisfactory. Stirring of a liquid to effect crystallization is, of course, not a new concept. However, it is to the aspect of agitation, both in respect to the manner in which agitation cooperates in the over-all method herein employed and as to the apparatus hereinafter described, in combination with the other features of the invention also set forth in detail hereinafter, that have been found to produce the desired product.

Considering particularly the preparation of DDT, the method of this invention involves a controlled supercooling in combination with the steps of discharging molten DDT in a relatively thin layer onto a moving surface which is adapted to transport the thin layer of DDT successively through a quiescent pool of semi-crystallized DDT, and thereafter in contact with stationary solid crystal masses of DDT while maintained in a supercooled state under temperature-controlled conditions. The supercooled DDT is then subjected to reciprocal agitation in the plane of surface movement in a direction substantially perpendicular to the direction of the moving surfaces, and thereafter is spread to a controlled thickness. The thus-treated material is allowed to solidify and is removed from the traveling surface in the form of thin flakes as an easily grindable and friable, crisp, brittle DDT product.

In general, the apparatus of the invention comprises a traveling metallic belt, the undersurface of which is maintained, over at least a portion of its length, at a predetermined temperature below the temperature of the material being transported thereon for crystallization. Cooling is accomplished by heat exchange with any suitable heat transfer medium applied to the undersurface of the belt. Water, of course, is typical and the commonly used heat transfer medium.

Means are provided for distributing the molten product as it flows from a storage point onto the belt in a thin layer. These means, in combination with a crystallizable material, retaining and distributing baffle, means for passing the molten material in contact with stationary crystals in the bath of the material being crystallized, together with an agitator positioned above the belt to provide reciprocal agitation transversely with respect to the belt movement and at a point dictated by a predetermined temperature drop early in the stages of the supercooling and thickness control means, comprise a crystallization control section, the operation of which will be described more fully hereinafter. Means, including valves and temperature indicators, are also provided in the apparatus for controlling the quantity and temperature of cooling medium at several points along the length of the belt. Additionally, means are provided for removing the crystallized product and for varying the speed of the belt so that the equipment may be adapted to a variety of environments and materials.

Referring now to the accompanying drawing, a consideration of which is helpful to a further understanding of the invention:

Fig. 6 is a view of a crystallizing material thickness-controlling device in accordance with the invention;

Fig. 7 is an enlarged fragmentary plan view of another embodiment of the invention.

Figure 1:
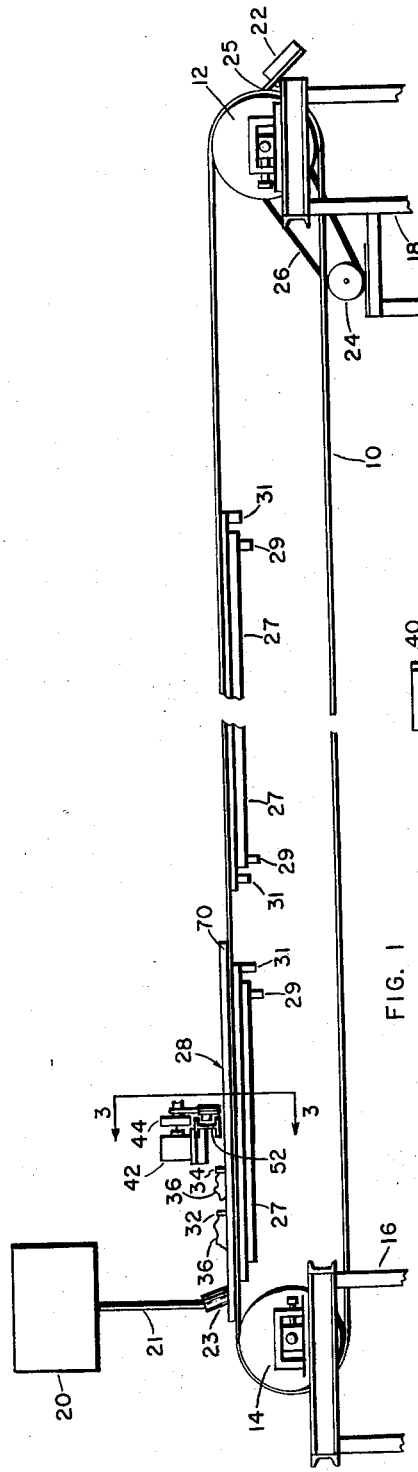
Fig. 1 is a schematic elevational view, with parts removed, of appartus embodying the invention.

Referring more particularly to the drawings, in Fig. 1 one embodiment of the appartus of the invention comprises an endless, substantially flat metal belt 10 adapted for movement in a continuous manner to transport material to be crystallized through a crystallization control section to a crystalline material discharge point. The apparatus includes a driving pulley 12, a driven pulley 14, support members indicated generally at 16 and 18, a supply container 20 for the material to be crystallized, feed means, including a material feeder 21 and distributor 23, crystallized product discharge means 22, including a doctor blade scraper 25, motor drive means 24, comprising a belt 26 through which power is transmitted to drive pulley 12, and a crystallization control section indicated generally at 28. Numerals 27 designate water-cooling pans which are provided with inlets 29 and outlets 31 and may be maintained in position by any suitable supporting structure.

Figure 2:
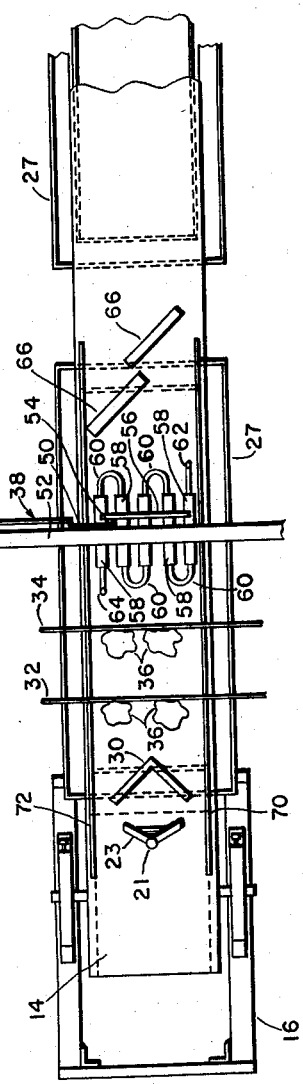
Fig. 2 is an enlarged fragmentary plan view of a portion of the apparatus shown in Fig. 1.
Figure 3:
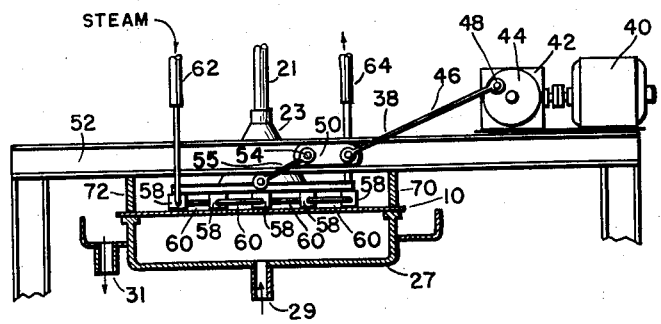
Fig. 3 is a view, partially in section, taken along the lines 3—3 of Fig. 1 illustrating the operation of the agitator mechanism.
Figure 4:
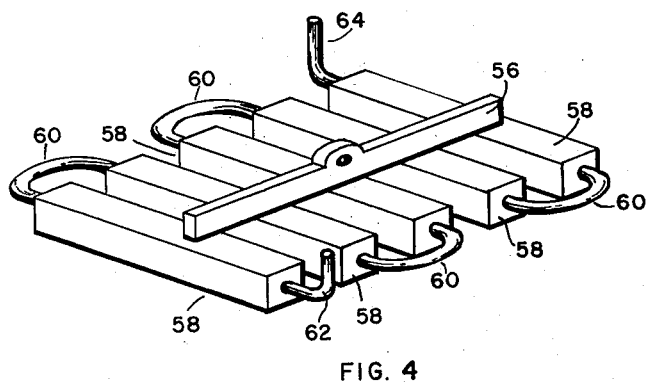
Fig. 4 is an enlarged perspective illustrating the details of the agitator of Fig. 3.
Figure 5:
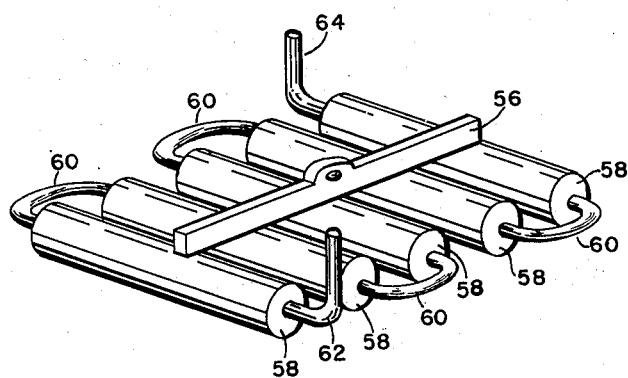
Fig. 5 is a view similar to Fig. 4 illustrating another embodiment of the agitator utilizing cylindrical agitator elements.

Fig. 2 illustrates the elements of the crystallization control section 28. This section comprises a V-shaped baffle member 30 adapted to provide on the belt 10 a quiescent pool of crystallizable material and to aid in distributing crystallizable material over the belt, and crystal mass-retaining bars 32 and 34 adapted to position and maintain in contact with the belt 10 one or more pieces 36 of stationary solid crystal masses of the same material as is being crystallized, which masses serve as so-called "seed lumps," as described hereinafter. Adjacent the retaining bars 32 and 34 is a reciprocal agitator indicated generally at 38. This agitator comprises a motor 40, a gear box 42, an eccentric drive wheel 44 driven by said motor 40 through the gear box 42, a drive arm 46 pivotally secured at 48 to eccentric drive wheel 44 and at its opposite end to a connecting element 50 adapted for reciprocal movement along a track member 52. The connecting element 50 is connected at its opposite end through a pivotal connection 54 and arm 55 to the frame 56 of the agitator assembly which comprises a plurality of hollow agitator elements 58 or 58' connected for longitudinal fluid flow therethrough by tubular members 60 or 60'. The agitator assembly is provided with an in let 62 or 62' and outlet 64 or 64' connected, respectively, to a source of steam or other heated fluid (not shown) and to a steam trap or other disposal means (not shown).

The agitator assembly 38 is adapted to provide a reciprocating agitator movement across the belt 10 substantially perpendicular to the direction or belt movement.

Positioned adjacent the agitator assembly 38 and mounted on any suitable support (not shown) at a predetermined distance above the belt are stationary, secondary baffles or leveling bars 66. These bars, better shown in Fig. 6, comprise resiliently mounted cylindrical or other hollow members each provided with a steam inlet and outlet 68 and 69, are adapted to be heated, when necessary, positioned from the belt 10 at a height sufficient to produce the desired product thickness, and guide off the crystallization area of the belt lumps of crystallized materials otherwise interfering with the production of a desired product. As shown in Fig. 6, the leveling bars 66 may be secured to a support member 71 by means of vertically slidable bolts 73 and 75 resiliently biased through springs 77 and 79.

The crystallization section 28 also includes channel-forming, side rail wall members 70 and 72 which are adapted to be heated internally, when necessary, and serve to prevent escape from the moving belt of liquid or semi-liquid materials being transported thereon in a liquid condition. Doctor blade 25 is of the conventional type employed in other flake operations, and the detail of it forms no part of this invention.

The general construction of the belt system and drive means is well-known to the art. However, it is to be noted that suitable adjusting means for the pulleys 12 and 14 and the belt 10 are usually provided so that proper traction of the belt may be maintained. Moreover, by the provision of suitable alarm mechanism indicating improper belt traction, the equipment may operate substantially unattended in this respect over long periods of time.

Agitator elements 58 or 58', the latter numeral indicating an embodiment utilizing cylindrical agitator elements, may be of varying length; however, in the embodiment here contemplated, they are from 12 to 14 inches long and are spaced across the belt by a distance from each other of 3 to 4 inches. Agitator element length is a factor in effective agitation, and if the treated material is traveling rapidly, greater length may be desirable to provide a longer period of time in which a given unit of material is exposed to agitation. In practice, when crystallizing DDT, the agitator elements are heated to a temperature which generally may vary between about 85 and 120° C., the temperature generally being controlled by regulation of steam pressure, a steam pressure of about 6 or 7 p.s.i.g. being typical.

While a single agitator assembly has been described in the foregoing paragraphs, it is to be understood that a series of such agitators may be employed. Additional agitators may be necessary, especially if the travel speed of the belt is increased. If the number of revolutions per hour of the belt is increased, the residence time of a unit part of the traveling, crystallizing mass in the span of the agitator is decreased and its probability of receiving the necessary agitating action is thereby reduced. Consequently, additional agitators may be required.

Agitator speed could be increased to accomplish the same purpose but, as in any case, the agitator produces quite a sloshing action, it may be found that the mass is too greatly disturbed by agitator speed increase. Entirely aside from the belt speed factor, additional agitation may be required due to material purity, temperature, atmospheric conditions, degree of crystal seeding, etc.

Fig. 7 illustrates one embodiment of apparatus of the invention utilizing a multiple unit reciprocal agitator assembly. This embodiment comprises a substantially flat, movable belt 80, support and drive means indicated generally at 82, material feeder 84, distributor 86, baffle 88, retaining bars 90 and 92, side rails 89 and 91, cooling pan 93, and an agitator assembly indicated generally at 94. The agitator assembly comprises supports 96, a motor 98, gear box 100, and a drive shaft 102 having oppositely disposed crank arm portions 104 and 106 pivotally connected, respectively, to drive arms 108 and 110. The drive arms are connected at their opposite ends 112 and 114, respectively, to slidable elements 116 and 118 adapted for reciprocal movement along the supports 96. In operation, the agitator units, comprising a plurality of hollow agitator elements 120 secured to frame members 121 and 123, which are connected to elements 116 and 118, respectively, and provided with fluid connections 122, steam inlets 124 and 126, and outlets 128 and 130, alternately move across the belt 80 at substantially right angles thereto. Numerals 87 indicate stationary crystal masses of the same material as is to be crystallized.

It is contemplated that a commercial installation may use a traveling belt providing an upper horizontal crystallization surface about 60 to 65 feet long. Contrasted with prior crystallization apparatus, typically employing belt speeds from 10 to 15 feet per minute, the practice of the present invention, by providing a substantially increased rate of crystallization, permits a large increase in belt speed to rates as high as 50 to 55 feet per minute in many applications. In crystallization of DDT, for example, complete crystallization generally may now be accomplished in from about 18 to 48 seconds, as contrasted with crystallization times as high as several minutes. Even more important, however, in the case of DDT, it is now possible to produce a thinner crystalline product having a thickness within the range from $1/32$ to $1/16$ inch. This is in marked contrast to prior crystallized DDT products which typically had a thickness of from $1/8$ to $5/16$ inch.

Thus far, it should be understood that the apparatus and method of this invention are particularly suited to operation under conditions normally encountered in a commercial establishment. The method and apparatus of this invention are each adapted, one to the other, to the end that conditions may be so regulated as the material being crystallized passes through the treating steps to the point of discharge that considerable variation in the environmental conditions will necessarily result in the production of unusable material, it being possible to control conditions in order to compensate for wide variations in surrounding temperature. However, there are generally extremes of temperatures which should be observed and operational speed and other factors of the apparatus and method should be controlled within limits if a completely salable product is to be obtained. For example, in crystallization of DDT it is contemplated that atmospheric temperatures within the range from about 15° to 35° C. prevail and that the belt of the apparatus provides a working surface of about 60 feet and is moving about 50 feet per minute.

Figure 8:
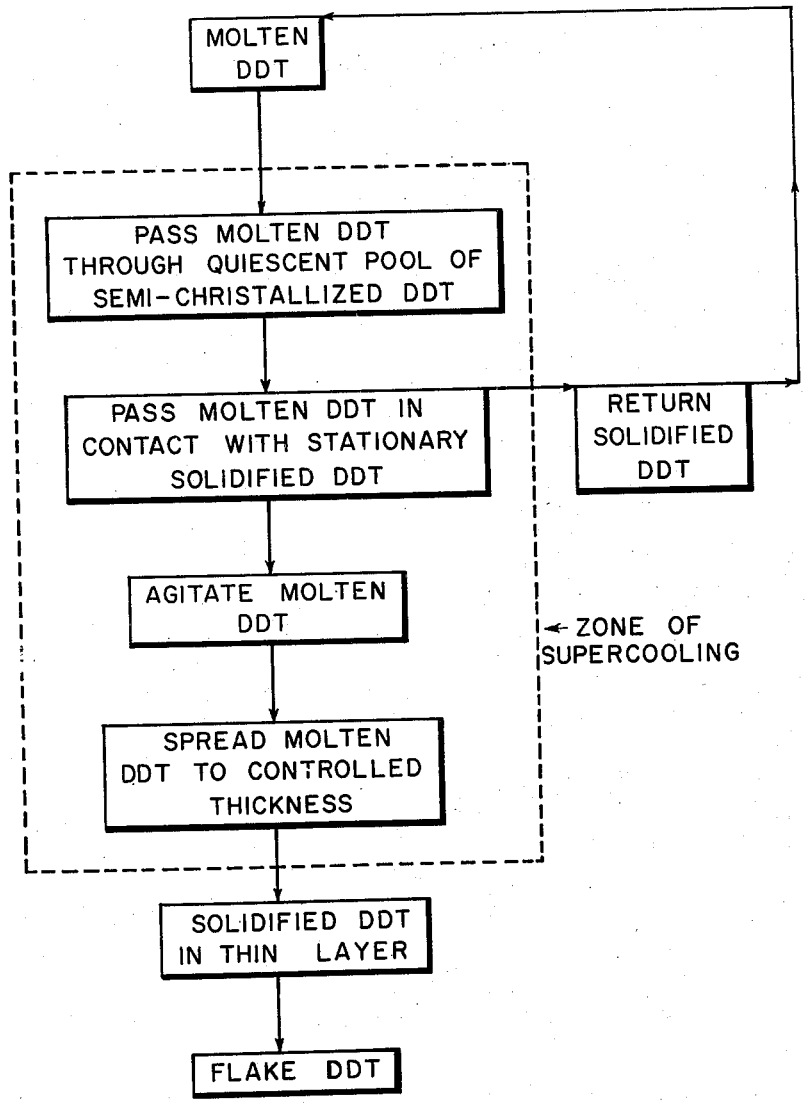
Fig. 8 is a schematic flow diagram illustrating the process of this invention as applicable to the preparation of DDT.

To aid in an understanding of the invention, reference is now made to Fig. 8, which schematically illustrates the process. Molten DDT is passed through a zone of supercooling wherein it successively passes through, under and around a quiescent pool of semi-crystallized DDT, and in contact with at least one stationary, solidified DDT crystal mass. The thus-treated supercooled DDT is then agitated and spread to a controlled thickness and allowed to solidify into a crystalline product characterized by improved grindability and friability. In a preferred embodiment, the stationary, solidified DDT crystal mass, which increases in size during operation, is returned to the source of the molten DDT feed. This process is described in more detail in the following paragraphs.

Molten DDT is stored in a heated and insulated container 20 near the traveling surface on which it is to be treated. DDT of commerce normally has a crystallization or transition point of approximately 90° C., and, in order for it to flow from a point of storage, its temperature must be above about 90° C. The temperature of the material in storage may suitably vary between about 90° and about 120° C., preferably between about 95° and 105° C. Temperatures higher than these are not necessary and apparently do nothing but create additional problems in cooling.

In practicing the invention, fused DDT at a temperature above about 90 C. is delivered to the traveling belt at a point near where the belt initially moves over a first cooling pan. The temperature of the water in the pan may suitably vary over a rather wide temperature range as dictated by numerous factors. However, it is desirable to cool the material quite quickly at this stage in the procedure. If, for example, an unusually thick layer of molten DDT is being deposited on the belt, for example, more than about ½ inch, it may be necessary to maintain the temperature of the belt somewhat lower than for a thin layer of material. This circumstance can be compensated for by decreasing the speed of the belt, although this slows production undesirably. Furthermore, it is preferable to maintain belt speed constant and vary other conditions of operation for, as the process is a continuous one, and as a belt speed at one time may be suitable to a given layer of material, its thickness, temperature, purity and other factors being considered, that belt speed might not be suitable for the conditions of the material deposited on the belt a short while later. Ordinarily, water in the first pan may suitably be maintained between about 25° and 40° C. Preferably, however, between about 34° C. In the second and succeeding pans, if any, the water temperature typically is about 60° C.

The DDT on the belt moves through the crystallization control section across the first pan and is supercooled to a temperature between about 50° and 70° C., preferably to a temperature of about 60° C. The temperature of the steam-traced sidewalls 70 which form a channel is maintained suitably between about 90° and about 120° C., preferably between 95° and 105° C.

The molten DDT is deposited on the traveling belt surface first contacts a baffle, typically a V-shaped baffle formed of one inch diameter nickel pipe, although other configurations providing an upstream concavity or providing a quiescent pool of molten DDT may be employed. This baffle aids in the uniform distribution of DDT over the belt and provides a quiescent pool of semi-crystallized, cloudy, slushy DDT through and under which the DDT liquid is transported.

The molten DDT, supercooled to a temperature of about 84° C., then passes around and under stationary, solidified crystal masses of DDT mounted downstream of the first baffle. The precise function of these so-called "seed lumps" is not clearly understood. However, they have been found to aid materially in effecting crystallization of a product having a greatly enhanced grindability and friability. The discovery has also been made that it is advantageous to return these stationary, solidified crystal masses of DDT to the source of the molten DDT feed. Although these crystal masses are referred to herein as seed lumps, they do not merely provide seed crystals as this expression is generally used in reference to crystallization operations, i.e., unlike conventional sources of seed crystals which are depleted in use; the crystal masses herein disclosed actually increase in size until they must be discarded. As pointed out hereinbefore, returning the large crystal masses to the source of the crystallizable material feed aids in producing an improved product.

During the period of time in which the DDT is exposed to cooling downstream of the seed lumps, it is subjected to vigorous reciprocal agitation employing heated agitator elements. Agitation of the mass may take place at any time after it has cooled below the normal transition temperature, i.e., between about 50° and about 90° C., more suitably between about 50° and about 70° C., and preferably at about 60° C. It is found that when agitation takes place at the lower temperature, more complete crystallization is achieved. The relationship which should be maintained between the heat of the agitator and the coolness of the DDT should be such that the DDT is not heated to above 75° to 80° C. as it passes through the agitator, bearing in mind that the agitator elements should be maintained at a temperature above the crystallization point of the material.

Generally, if the method and apparatus are operated within the limits above indicated, and especially if they are operated under the specified preferable conditions, the mass will begin to solidify a few seconds after agitation and about the time the traveling belt is transporting the material from above the first cooling pan. Preferably, however, it is found that the crystallizing material emerging from the crystallization control section should be allowed to solidify under normal atmospheric conditions, that is to say, between about 15° and 35° C., suitably 20° to 25° C. for a period of time sufficient in length to bring about complete crystallization to the solid state. Generally, 30 to 50 seconds or less sufficient for this purpose. Conceivably, as indicated previously, atmospheric conditions may be such that water, suitably warm to slow the cooling rate in the second stage, is necessary if heat interchange from the DDT at a sufficiently low rate is to be maintained.

After the supercooled DDT is transported through the agitator, it passes under a spring-biased, or otherwise resiliently mounted, second baffle comprising one or more baffle elements disposed at an angle with respect to the belt movement thereby to guide to one side of the belt any lumps or other outsized crystallizing material. At present, it is preferred to employ two cylindrical tubular baffle elements, adapted to be heated internally, in a substantially parallel stepped relationship one to another. While the foregoing 2-element baffle downstream of the agitator is preferred, in certain applications it is advantages to utilize only one such baffle element and/or to employ more than one set of such baffles, e.g., the use of a similar set of two baffle elements upstream of the hereinbefore-mentioned "seed lumps" has been found helpful in some instances. In practice, typical leveling bars are formed of 1½ inch diameter copper, stainless steel, or Monel metal tubes adapted for internal heating with steam or other heated fluid.

Ordinarily, by the time DDT has been transported through the crystallization control section, all problems relating to actually crystallizing the material no longer exist. However, quite often it is found in the operation of the apparatus and method that a thin layer of DDT adjacent the belt itself adheres quite strongly to the belt and there exists a problem of its removal. It is found that cooling of the belt after crystallization is substantially complete effects a release of the material from the belt without difficulty. Additionally, while it is difficult to establish the correctness of the belief, it is believed that the product is improved somewhat if it is continued to be cooled up to the point when it is discharged. This improvement, if any, seems to manifest itself in a product of greater hardness.

The degree of cooling, i.e., the total temperature drop, of the material, after it has left the crystallization control section, is not found to be especially critical to the production of a good product. As indicated previously, the temperature of the material in the crystallization control section may be as high as 80° C. and the material may be flaked from the belt at a temperature as high as 55° C. and as low as desired. However, there is no reason for cooling the material below normal room temperature, i.e., about 20° to 25° C., so long as it is possible to flake the material from the belt.

It is to be understood that although the invention has been described with specific reference to particular embodiments thereof, it is not to be so limited, since changes and alterations therein may be made which are within the full intended scope of this invention as defined by the appended claims.

What is claimed is:

1. A method of crystallizing a molten material into a product characterized by improved grindability and friability, said method comprising depositing said material in a molten condition as a thin layer and transporting said material through a zone of supercooling wherein said material is passed successively through a quiescent pool of the semi-crystallized material being transported, in contact with stationary masses of solidified crystals of the material being transported, thereafter agitating and surface heating the material in a thin layer, and spreading the thus supercooled liquid material to a controlled thickness and allowing it to solidify in a thin brittle layer.

2. A method as in claim 1 wherein the stationary solidified crystals of the material being transported are periodically removed and placed in the source of the molten material to be crystallized.

3. A method of crystallizing DDT into a product characterized by improved grindability and friability, said method comprising depositing said DDT in a molten condition as a thin layer upon a moving surface and transporting said material through a zone of supercooling wherein said DDT is passed successively through a quiescent pool of the semi-crystallized DDT being transported, in contact with stationary masses of solidified DDT crystals, thereafter agitating the DDT in a thin layer, and spreading the thus supercooled liquid DDT to a controlled thickness and allowing it to solidify in a thin brittle layer.

4. A method as in claim 3 wherein the stationary solidified DDT crystals are periodically removed and placed in the source of the molten DDT to be crystallized.

5. The method of producing thin, friable DDT, said method comprising the steps of depositing molten DDT in a thin layer on a moving surface, said surface transporting the molten DDT successively through a quiescent pool of semi-crystallized DDT, in contact with stationary solidified DDT, in contact with heated agitators moving substantially perpendicularly to the direction of movement of said surface, under horizontally disposed, stationary leveling bars positioned from the moving surface at a distance substantially equal to the DDT product desired, said moving surface passing over heat transfer means adapted to providing predetermined temperatures, and removing from said surface after complete solidification thereon a thin, friable DDT flake product.

References Cited in the file of this patent

UNITED STATES PATENTS

| | | |
|---|---|---|
| 1,653,390 | Coltman | Dec. 20, 1927 |
| 2,453,076 | Little et al. | Nov. 2, 1948 |
| 2,491,160 | Bruce et al. | Dec. 13, 1949 |
| 2,564,406 | Neher et al. | Aug. 14, 1951 |
| 2,613,396 | Montgomery et al. | Oct. 14, 1952 |
| 2,622,105 | Miller et al. | Dec. 16, 1952 |

UNITED STATES PATENT OFFICE
CERTIFICATE OF CORRECTION

September 8, 1959

Patent No. 2,902,719

Lawrence W. Hindes et al

It is hereby certified that error appears in the printed specification of the above numbered patent requiring correction and that the said Letters Patent should read as corrected below.

Column 2, line 61, after "moving" for the word "surfaces" read -- surface --; column 4, line 11, after "an", for "in let" read -- inlet --; line 17, for "direction or" read -- direction of --; column 6, line 44, after "about", second occurrence, insert -- 30° and about --; column 8, line 62, for "to providing" read -- to provide --.

Signed and sealed this 5th day of April 1960.

(SEAL)
Attest:

KARL H. AXLINE
Attesting Officer

ROBERT C. WATSON
Commissioner of Patents